United States Patent
Hayashi

(10) Patent No.: US 9,055,262 B2
(45) Date of Patent: Jun. 9, 2015

(54) IMAGE FORMING APPARATUS FOR DETERMINING AMOUNT OF TRANSPARENT TONER ON TARGET PIXEL BASED ON DISPERSION OF THE TARGET PIXEL, METHOD OF FORMING IMAGE, AND COMPUTER-READABLE RECORDING MEDIUM THEREOF

(75) Inventor: Koji Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 670 days.

(21) Appl. No.: 13/329,484

(22) Filed: Dec. 19, 2011

(65) Prior Publication Data

US 2012/0162720 A1    Jun. 28, 2012

(30) Foreign Application Priority Data

Dec. 28, 2010    (JP) ................. 2010-292098
Nov. 8, 2011    (JP) ................. 2011-244776

(51) Int. Cl.
| | |
|---|---|
| H04N 1/40 | (2006.01) |
| H04N 1/54 | (2006.01) |
| G03G 15/00 | (2006.01) |
| G03G 9/08 | (2006.01) |

(52) U.S. Cl.
CPC ............. *H04N 1/54* (2013.01); *G03G 15/5025* (2013.01); *G03G 15/6585* (2013.01)

(58) Field of Classification Search
None
See application file for complete search history.

(56) References Cited

U.S. PATENT DOCUMENTS

| | | | |
|---|---|---|---|
| 6,088,546 A | 7/2000 | Inoue et al. | |
| 6,984,034 B2 * | 1/2006 | Tsujimoto | 347/105 |
| 8,031,371 B2 * | 10/2011 | Ohta et al. | 358/2.1 |
| 2006/0284929 A1 * | 12/2006 | Matsuzawa et al. | 347/43 |
| 2009/0067863 A1 | 3/2009 | Sakata | |
| 2012/0050759 A1 * | 3/2012 | Yoshihara | 358/1.9 |

FOREIGN PATENT DOCUMENTS

| | | | |
|---|---|---|---|
| JP | 08202199 A | 8/1996 | |
| JP | 11044980 A | 2/1999 | |
| JP | 2003005489 A | 1/2003 | |
| JP | 2003011461 A | 1/2003 | |
| JP | 3877212 B2 | 2/2007 | |
| JP | 2007057711 A | 3/2007 | |
| JP | 2007264263 A | 10/2007 | |
| JP | 200969312 A | 4/2009 | |

(Continued)

OTHER PUBLICATIONS

Abstract of JP 2003-005489 published Jan. 8, 2003.

(Continued)

*Primary Examiner* — Steven Kau
(74) *Attorney, Agent, or Firm* — Harness, Dickey & Pierce P.L.C.

(57) ABSTRACT

Disclosed is an image forming apparatus capable of forming an image with a colored toner and a transparent toner based on image data of a read document, including a dispersion calculation unit that calculates a dispersion of a target pixel and a group of pixels including the target pixel and peripheral pixels of the target pixel; an applying area determining unit that determines whether to apply the transparent toner on the target pixel based on the dispersion of the target pixel; and an amount determining unit that determines an amount of the transparent toner to be applied on the target pixel for which the transparent toner is determined to be applied based on the dispersion of the target pixel.

14 Claims, 14 Drawing Sheets

(56) References Cited

FOREIGN PATENT DOCUMENTS

| | | |
|---|---|---|
| JP | 2009151238 A | 7/2009 |
| JP | 2009251058 A | 10/2009 |

OTHER PUBLICATIONS

Abstract of JP 2005-031223 published Feb. 3, 2005.
Abstract of JP 2009-251058 published Oct. 29, 2009.
Abstract of JP 2009-151238 published Jul. 9, 2009.
Abstract of JP 2007-264263 published Oct. 11, 2007.
Abstract of JP 2003-011461 published Jan. 15, 2003.
Abstract of JP 11-044980 published Feb. 16, 1999.
Abstract of JP 2007-057711 published Mar. 8, 2007.

* cited by examiner

IMAGE FORMING APPARATUS FOR DETERMINING AMOUNT OF TRANSPARENT TONER ON TARGET PIXEL BASED ON DISPERSION OF THE TARGET PIXEL, METHOD OF FORMING IMAGE, AND COMPUTER-READABLE RECORDING MEDIUM THEREOF

BACKGROUND OF THE INVENTION

1. Field of the Invention

The present invention relates to an image forming apparatus, a method of forming an image, and a computer-readable recording medium and more specifically, to an image forming apparatus, a method of forming an image, and a computer-readable recording medium having recorded thereon a program that causes a computer to execute a method of forming an image where an image is formed with a colored toner and a transparent toner based on image data of a read document.

2. Description of the Related Art

An image forming apparatus capable of applying a transparent toner (an achromatic toner, a clear toner) based on gloss of a document or a kind of printing paper is known. As for such an image forming apparatus, when the transparent toner is applied, the transparent toner is coated on an entire surface of the paper, the transparent toner is coated on an entire surface of the image after detecting the image, the transparent toner is coated on an area indicated by a user or the like, for example.

Japanese Laid-open Patent Publication No. 2009-151238 discloses a method where the gloss of a document and a kind of printing paper are detected and the condition of the image formation is determined based on the detected gloss of the document and the kind of printing paper for having the appearance of the printed document close to that of the original document.

Japanese Patent No. 3877212 discloses a method where an image formation with a transparent toner is performed on an area where an image formation with color toners is not performed.

However, according to the related art, for applying the transparent toner on a certain area for having the appearance of the printed document close to that of the original document, an operation of indicating the area on which the transparent toner is to be applied is necessary and it is bothersome for a user.

Further, when the transparent toner is applied on the entire surface of the paper or the entire surface of the image, a large amount of the transparent toner is necessary.

SUMMARY OF THE INVENTION

The present invention is made in light of the above problems, and may provide an image forming apparatus capable of automatically determining an area where a transparent toner is to be applied and an amount of the transparent toner to be applied for reducing the consumed amount of the transparent toner.

The present invention has been made based on the knowledge the inventors have thus obtained and has the following configurations.

According to an embodiment, there is provided an image forming apparatus capable of forming an image with a colored toner and a transparent toner based on image data of a read document, including: a dispersion calculation unit that calculates a dispersion of a target pixel and a group of pixels including the target pixel and peripheral pixels of the target pixel, for each of the pixels of the image data; an applying area determining unit that determines whether to apply the transparent toner on the target pixel or not based on the dispersion of the target pixel, for each of the pixels of the image data; and an amount determining unit that determines an amount of the transparent toner to be applied on the target pixel for which the transparent toner is determined to be applied based on the dispersion of the target pixel, for each of the pixels of the image data.

According to another embodiment, there is provided a method of forming an image by an image forming apparatus capable of forming an image with a colored toner and a transparent toner based on image data of a read document, the method including: calculating a dispersion of a target pixel and a group of pixels including the target pixel and peripheral pixels of the target pixel, for each of the pixels of the image data; determining whether to apply the transparent toner on the target pixel or not based on the dispersion of the target pixel, for each of the pixels of the image data; and determining an amount of the transparent toner to be applied on the target pixel for which the transparent toner is determined to be applied based on the dispersion of the target pixel, for each of the pixels of the image data.

According to another embodiment, there is provided a non-transitory computer-readable recording medium having recorded thereon a program that causes a computer of an image forming apparatus, capable of forming an image with a colored toner and a transparent toner based on image data of a read document, to execute a method, including: calculating a dispersion of a target pixel and a group of pixels including the target pixel and peripheral pixels of the target pixel, for each of the pixels of the image data; determining whether to apply the transparent toner on the target pixel or not based on the dispersion of the target pixel, for each of the pixels of the image data; and determining an amount of the transparent toner to be applied on the target pixel for which the transparent toner is determined to be applied based on the dispersion of the target pixel, for each of the pixels of the image data.

According to the embodiment, an area where a transparent toner is to be applied and an amount of the transparent toner to be applied can be automatically determined to reduce the consumed amount of the transparent toner.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
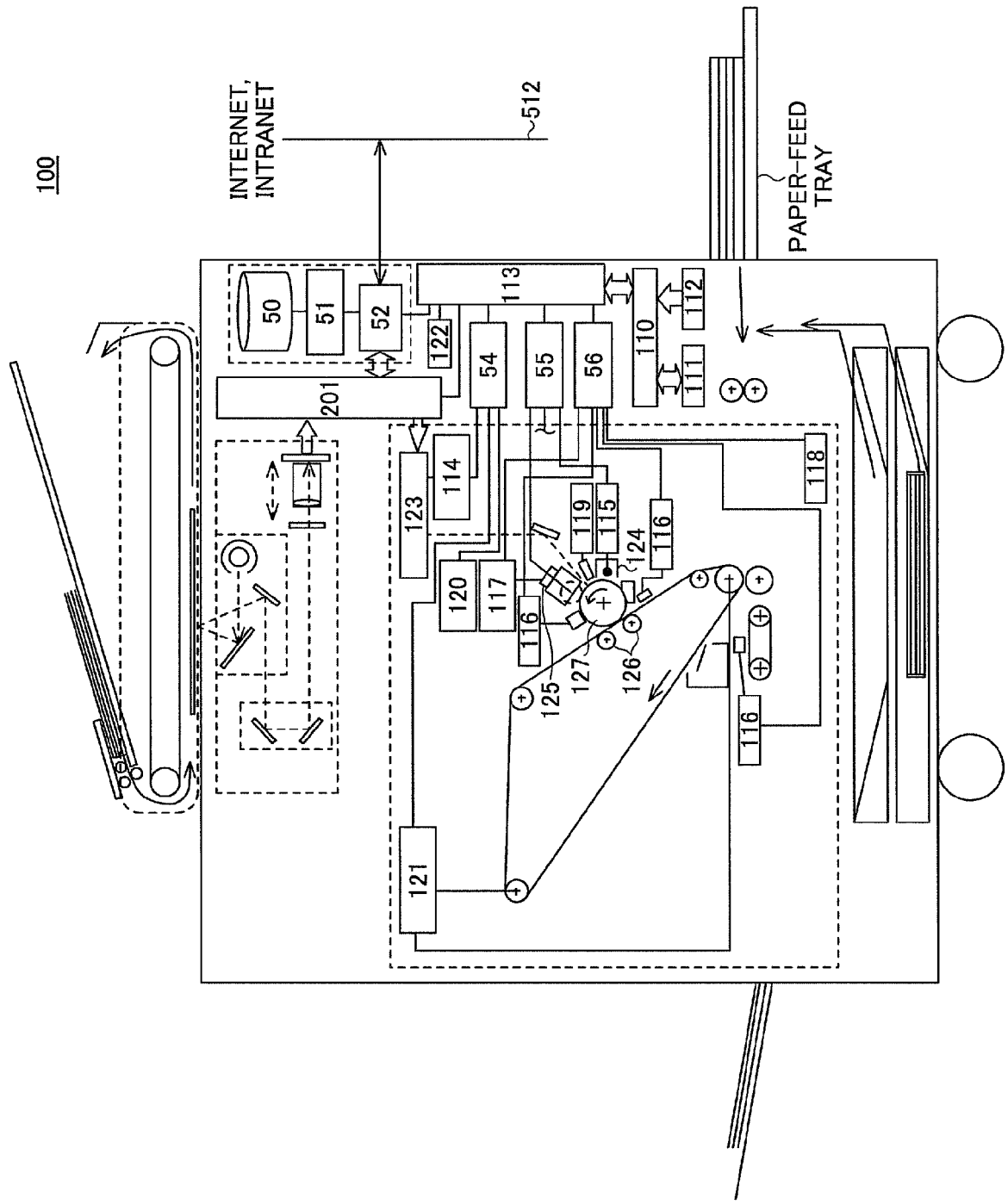
FIG. 1 is an explanatory view for explaining the structure of an image forming apparatus according to an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to drawings.

It is to be noted that, in the explanation of the drawings, the same components are given the same reference numerals, and explanations are not repeated.

According to the following embodiments, an image forming apparatus determines whether to apply a transparent toner or not on a target pixel and an amount of the transparent toner to be applied when it is determined to apply the transparent toner on the target pixel, based on a dispersion of read values, for each pixel of image data obtained by reading a document.

(First Embodiment)

Next, the first embodiment will be described below with reference to drawings.

FIG. 1 is an explanatory view for explaining the structure of an image forming apparatus 100 of the first embodiment.

The image forming apparatus 100 of the present embodiment includes a main control unit (CPU, Central Processing Unit) 110, a RAM (Random Access Memory) 111, a ROM (Read Only Memory) 112, an interface I/O 113, a laser optical control unit 114, power circuits 115, optical sensors 116, a toner concentration sensor 117, an environment sensor 118, photosensitive surface potential sensors 119 (only one of which is shown in the drawings), a toner supply circuit 120, an intermediate transfer belt driver 121, an operations unit 122, a laser optical scanning system 123, charging devices 124 (only one of which is shown in the drawings), developing devices 125 (only one of which is shown in the drawings), bias rollers 126 (only one set of which is shown in the drawings), and photosensitive drums 127 (only one of which is shown in the drawings) in its main body. The image forming apparatus 100 further includes a paper-feed tray, a storage device 50, a storage device control unit 51, a communication control unit 52 that controls communications via a network such as INTERNET or an intranet, a driver control unit 54, a power-bias control unit 55, a sensor control unit 56, and a scanner-IPU control unit 201. The components, the circuits and the sensors are connected to the CPU 110.

Figure 2:
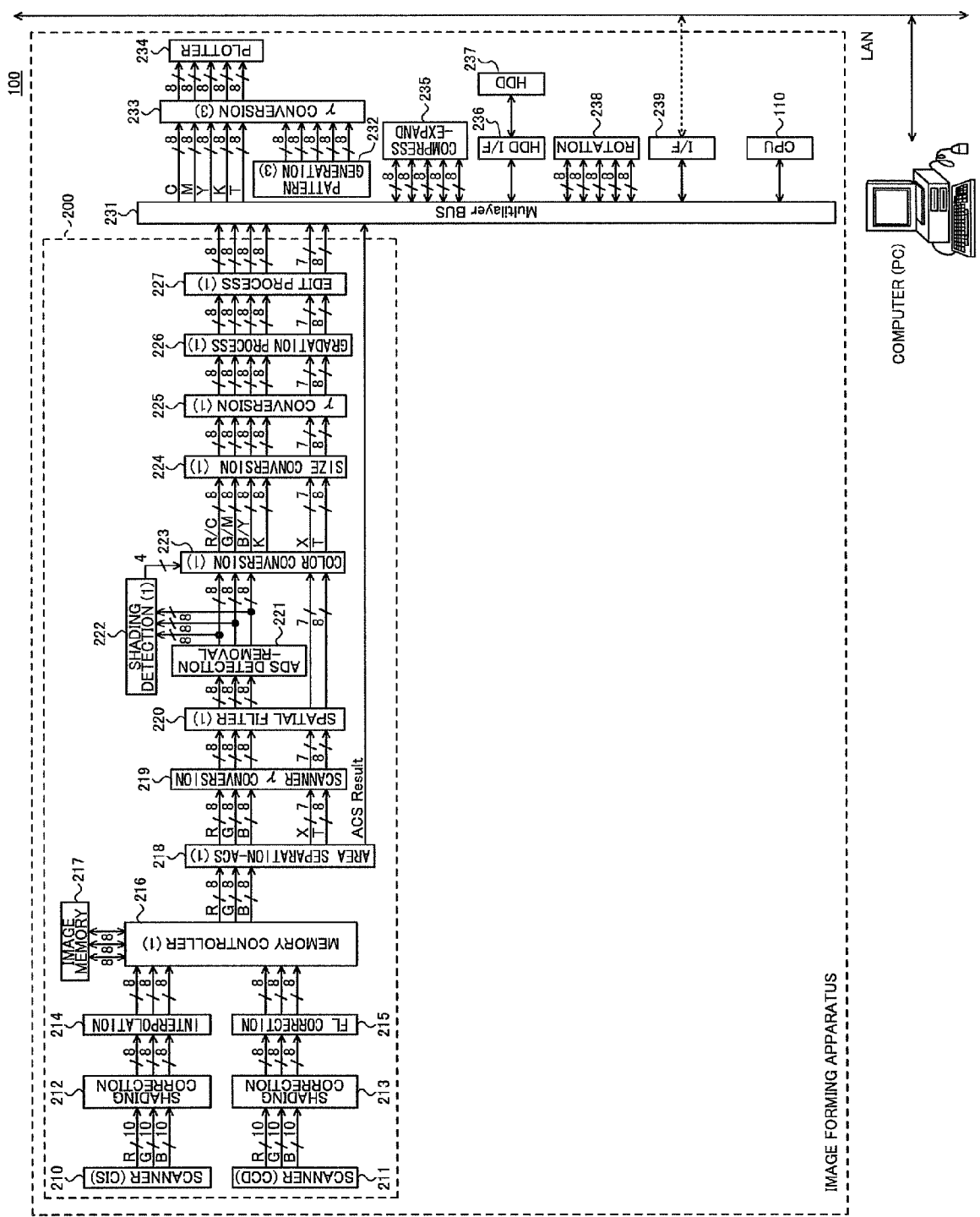
FIG. 2 is an explanatory view of an image forming unit of the image forming apparatus according to the embodiment.

The image forming apparatus 100 further includes an image forming unit 200 (see FIG. 2). The structure of the image forming unit 200 will be explained later in detail.

The laser optical control unit 114 of the present embodiment adjusts the laser output of the laser optical scanning system 123. The power circuit 115 supplies a predetermined discharge voltage for charging the charging device 124. The power circuit 115 supplies a developing bias of a predetermined voltage onto the developing device 125. The power circuit 115 supplies a predetermined transfer voltage onto the bias rollers 126.

The optical sensors 116 may be composed of a light emitting element such as a light emitting diode (LED) or the like and a light receiving element such as a photo sensor or the like placed near the transferred area. The optical sensor 116 detects a toner deposit amount of a toner image of a detected pattern latent image and a toner deposit amount of a ground part formed on the photosensitive drums 127 for respective colors. The optical sensor 116 detects residual potentials of the photosensitive drum 127s after discharging.

The detected signal from the optical sensor 116 of the present embodiment is supplied to an optical sensor control unit, not shown in the drawings. The optical sensor control unit calculates a ratio between the toner deposit amount of the toner image of the detected pattern latent image and the toner deposit amount of the ground part, detects a variation in an image concentration by comparing the calculated ratio with a standard value, and corrects the corresponding control values for CMYK (cyan, magenta, yellow and black) colors of the toner concentration sensor 117.

The toner concentration sensor 117 of the present embodiment detects the concentration of the toner based on a permeability variation of a developer in the developing device 125. The toner concentration sensor 117 compares the detected toner concentration with a standard value, and when the toner is inadequate as the toner concentration becomes lower than a set value, provides a toner supply signal with a magnitude corresponding to the inadequate amount of the toner to the toner supply circuit 120.

The potential sensor 119 detects a surface potential of the photosensitive drum 127. The intermediate transfer belt driver 121 controls a driving operation of the intermediate transfer belt.

Although not shown in the drawings, the image forming apparatus 100 of the present embodiment includes photosensitive drums corresponding to the CMYK colors and the transparent toner. As for the image forming apparatus 100 of the present embodiment, similar to the photosensitive drum 127, each of the photosensitive drums includes the charging device 124, the power circuit 115, the developing device 125 and other sensors. It means that the image forming apparatus 100 of the present embodiment includes five or more developing devices 125 corresponding to the CMYK colors and the transparent toner.

Referring to FIG. 2, the image forming unit 200 of the image forming apparatus 100 of the present embodiment will be explained. FIG. 2 is an explanatory view of the image forming unit 200 of the image forming apparatus 100 according to the first embodiment.

The image forming apparatus 100 of the present embodiment includes the image forming unit 200. The image forming unit 200 of the present embodiment includes scanners 210 and 211, shading correction circuits 212 and 213, an interpolation circuit 214, a FL (First Last) correction circuit 215, a memory controller 216, an image memory 217, an area separation-ACS (Auto Color Selection) determining circuit 218, a scanner γ conversion circuit 219, a spatial filter circuit 220, an auto gradation adjustment level (ADS) detection-removal circuit 221, a shading detection circuit 222, a color conversion UCR (under color removal) process circuit 223, a size conversion process circuit 224, a γ conversion circuit 225, a gradation process circuit 226, and an edit process circuit 227.

Here, the FL correction is an operation to reduce the output difference (difference in tone) between the first part and the last part of the CCDs (Charge Coupled Device) for reading Red/Green/Blue image signals. The FL correction reduces the output difference (difference in tone) between the first part and the last part when CCDs structured to have two lines of the first part and the last part divided at the center are used. Further, in each line of the first part and the last part, the pixels of even positions and odd positions are read by different CCDs so that the FL correction circuit 215 of the present embodiment corrects output difference between the pixels at the even positions and the odd positions as well.

The image forming apparatus 100 of the present embodiment further includes a Multilayer BUS 231, a pattern generation circuit 232, a γ conversion circuit 233, a plotter 234, a compress-expand circuit 235, a HDD I/F (Hard Disk interface) 236, a HDD 237, a rotation process circuit 238, and an external interface I/F 239.

A case where duplex copying is to be performed at the image forming apparatus 100 of the present embodiment will be explained.

In the image forming apparatus 100 of the present embodiment, when the duplex copying is to be performed, the scanner 210 reads one surface of the document as a front surface and performs a color separation of R, G, and B. For example, in this embodiment, the scanner 210 obtains image signals of 10 bits. In the image forming apparatus 100, the scanner 211 reads the other surface of the document as a back surface and performs a color separation of R, G, and B. For example, in this embodiment, the scanner 211 obtains image signals of 10 bit signals. In this embodiment, both surfaces of the document are read by a single transferring operation.

The shading correction circuit 212 corrects unevenness of the image signals in a main scanning direction read by the scanner 210 to output 8 bits. Similarly, the shading correction circuit 213 corrects unevenness of the image signals in a main scanning direction read by the scanner 211 to output 8 bit signals.

The interpolation circuit 214 interpolates pixel values of pixels between chips of the scanner 210 aligned in the main scanning direction based on the pixel values (read values) of the respective adjacent pixels.

The FL correction circuit 215 corrects the difference in sensitivity (difference in tone) for a pair of scanners composing the scanner 211 aligned in the main scanning direction.

The memory controller 216 temporarily stores image data read by the scanner 210, and processed by the shading correction circuit 212 and the interpolation circuit 214 in the image memory 217. Further, the memory controller 216 temporarily stores image data read by the scanner 211, and processed by the shading correction circuit 213 and the FL correction circuit 215 in the image memory 217. The image memory 217 of the present embodiment may be a DDR (Double-Data-Rate) memory.

In the image forming apparatus 100 of the present embodiment, the area separation-ACS determining circuit 218 of the image forming unit 200 performs an area separation detection, a color detection, and a calculation of an amount of the transparent toner to be applied for the image data (signals R, G, and B). In FIG. 2, the result of the area separation detection is expressed as "X", the result of the color detection is expressed as "ACS Result", and the result of the calculation of the amount of the transparent toner to be applied is expressed as "T".

In this embodiment, the area separation-ACS determining circuit 218 determines an applying area where the transparent toner is to be applied and the amount of the transparent toner to be applied. The operation of the area separation-ACS determining circuit 218 will be explained later in detail.

The rest of the operations of the image forming unit 200 after the operation of the area separation-ACS determining circuit 218 are similar as those of known techniques and the explanation is not provided here.

Figure 3:
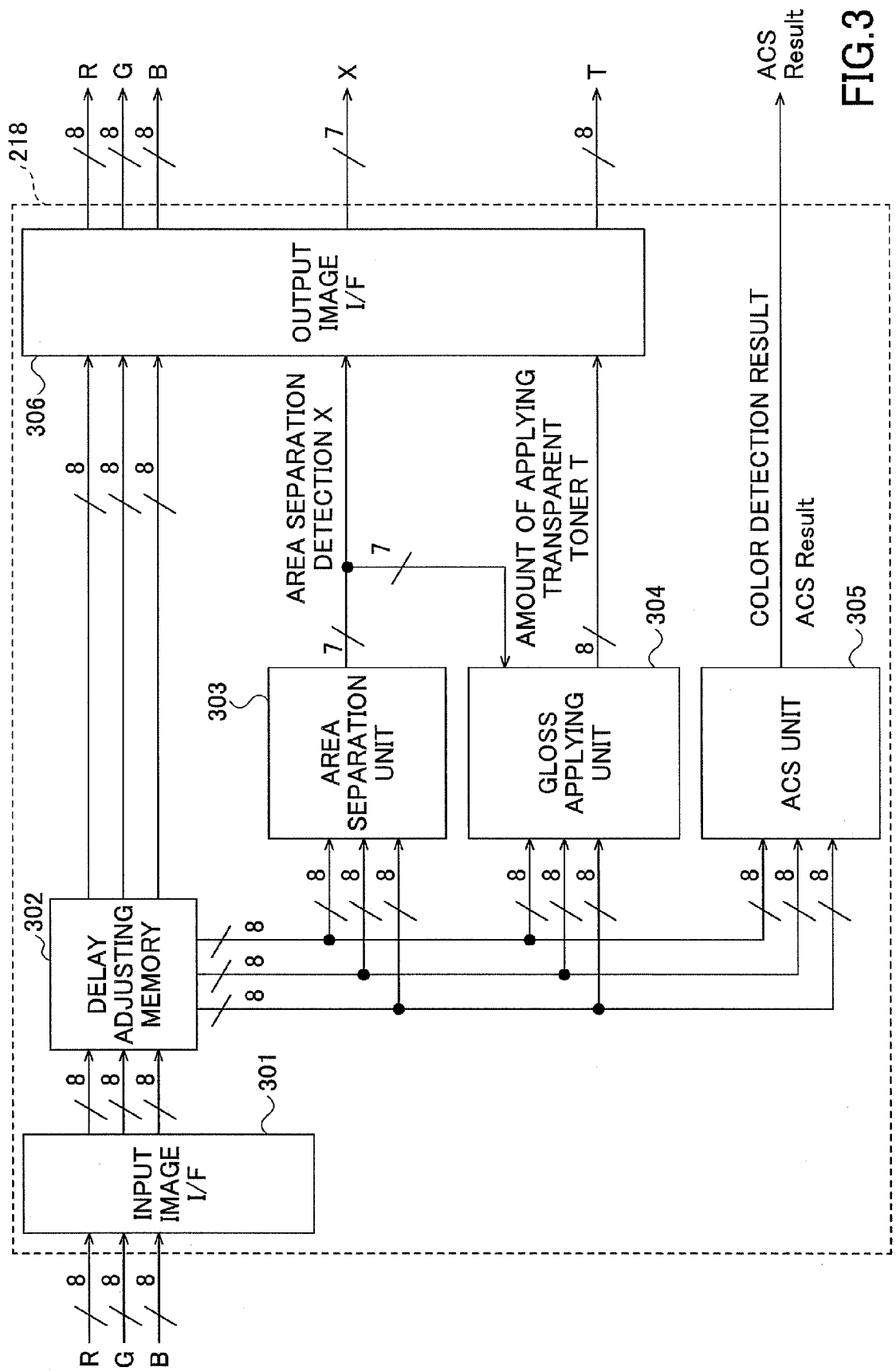
FIG. 3 is an explanatory view of an area separation-ACS detection circuit of the embodiment.

Referring to FIG. 3, operations of the area separation-ACS determining circuit 218 are explained in detail. FIG. 3 is an explanatory view of the area separation-ACS detection circuit according to this embodiment.

The area separation-ACS determining circuit 218 of the present embodiment includes an input image I/F 301, a delay adjusting memory 302, an area separation unit 303, a gloss applying unit 304, an ACS (Auto Color Selection) unit 305, and an output image I/F 306.

The input image I/F 301 performs a logical inversion of the image data (signals R, G and B) based on the necessity for the following operations in the area separation-ACS determining circuit 218. The delay adjusting memory 302 adjusts the timing of outputting the image data and other output results based on the necessity for the following operations in the area separation-ACS determining circuit 218. The area separation unit 303 detects for each of the pixels of the input image data whether that pixel is character-non character, chromatic-achromatic, dot-non dot and the like and outputs the detected results as the area separation detection "X".

The gloss applying unit 304 automatically determines an appropriate area where the transparent toner is to be applied based on the image data. Further, the gloss applying unit 304 determines the amount of the transparent toner to be applied for the determined area. Operation of the gloss applying unit 304 will be explained later in detail.

The ACS unit 305 detects whether the image data is of a monochrome document or a color document, and outputs the result (ACS Result). The output image I/F 306 performs a logical detection on the image data on which the logical inversion is performed by the input image I/F 301, and corrects the logic of white and black (whether o (zero) expresses white or black) so that the logic represents the input image data.

The operation of the gloss applying unit 304 of the present embodiment is explained. In this embodiment, the gloss applying unit 304 serves as a dispersion calculation unit, an applying area determining unit and an amount determining unit.

The gloss applying unit 304 of the present embodiment reads out the image data from the image memory 217.

Then, the gloss applying unit 304 (the dispersion calculation unit) calculates a dispersion of a target pixel and a group of pixels including the target pixel and peripheral pixels of the target pixel.

The gloss applying unit 304 (the applying area determining unit) then determines the applying area where the transparent toner is to be applied (hereinafter simply referred to as an "applying area"). Concretely, the gloss applying unit 304 determines whether to apply the transparent toner on the target pixel or not based on the dispersion of the target pixel.

The gloss applying unit 304 (the amount determining unit) determines the amount of the transparent toner to be applied on the target pixel for which the transparent toner is determined to be applied based on the dispersion of the target pixel. The gloss applying unit 304 performs the above operations for each of the pixels of the image data.

In this embodiment, the gloss applying unit 304 calculates the dispersion of the target pixel and the group of pixels including the target pixel and the peripheral pixels of the target pixel based on the read values of them. The read values may be values expressing brightness of each pixel.

Therefore, in this embodiment, the gloss applying unit 304 may determine the applying area and the applying amount of the transparent toner based on the dispersion of the brightness of the image data.

The dispersion of the brightness of the image data is explained with reference to FIGS. 4A to 4D. FIGS. 4A to 4D are explanatory views for explaining the dispersion of the brightness of the image data.

Figure 4A:
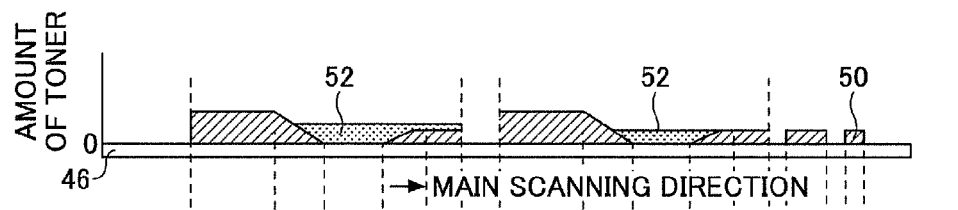
FIGS. 4A to 4D are explanatory views for explaining the dispersion of the brightness of the image data.
Figure 4B:
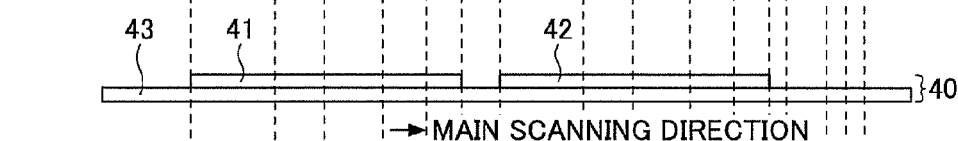
Figure 4C:
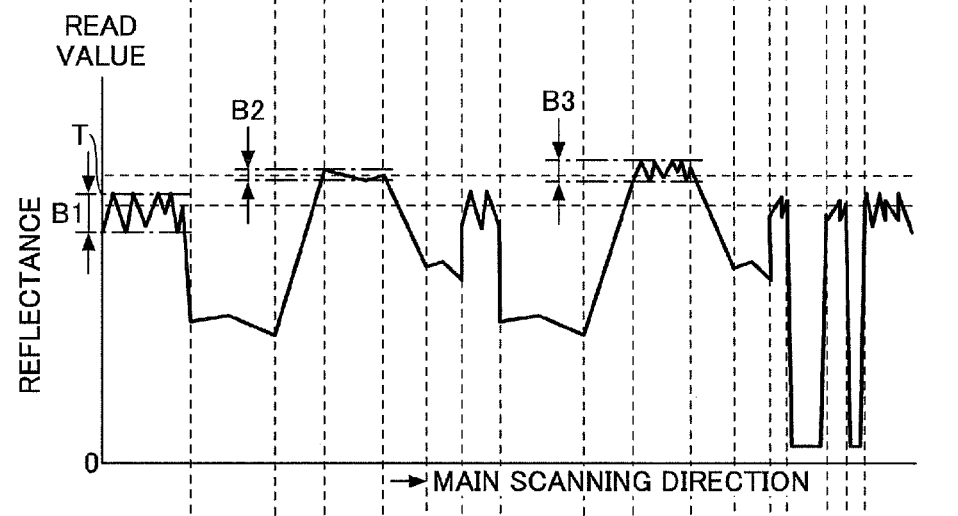
Figure 4D:
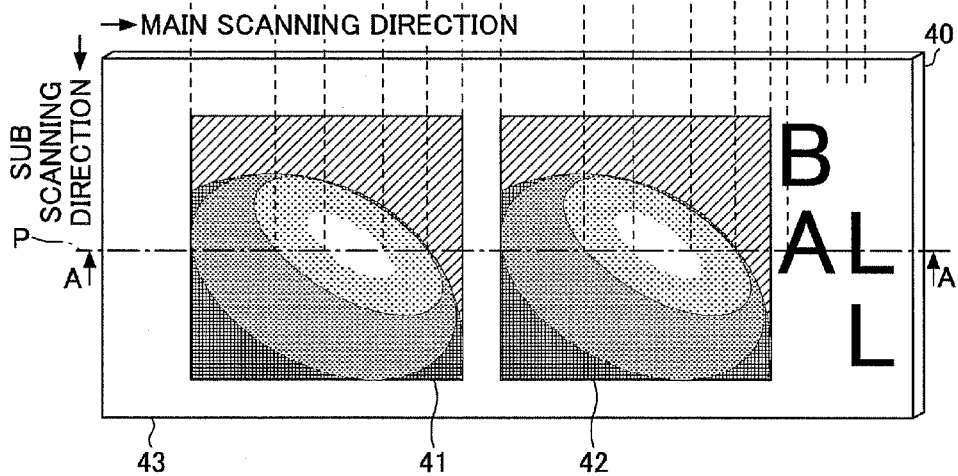

FIG. 4A shows an applying amount of the transparent toner on a printing paper 46. FIG. 4B shows a cross-sectional view of a document 40 taken at A-A line in FIG. 4D. FIG. 4C shows an example of read values of the image data. FIG. 4D shows an example of the document 40.

The document 40 shown in FIG. 4B and FIG. 4D is composed of a plain paper 43 and photographic papers 41 and 42 which are attached on the plain paper 43. In this embodiment, the photographic paper 41 and the photographic paper 42 may be glossy pictures of a ball.

The read values (reflectance) of the image data at the read position P (see FIG. 4D) is shown in FIG. 4C. The read value of the present embodiment may be a brightness (reflectance) of the image data. The read value of the image data varies depending on a kind of paper of the document, whether a picture is included or not, whether gloss is included or not, or the like.

For example, it can be understood from FIG. 4C that a dispersion B1 of the read values of a ground part of the plain paper 43 is greater than dispersions 32 and B3 of the read values of ground parts of the photographic papers 41 and 42. Further, for the document 40, the read values of ground parts and drawing parts where drawings exist are largely different. Here, the drawing part means a part except the ground part or a part where a character exists. In the example shown in FIG. 4D, parts on the plain paper 43 except for the characters (BALL) may be the ground parts while parts of the photographic papers 41 and 42 may be the drawing parts.

The gloss applying unit 304 of the present embodiment determines the applying amount of the transparent toner based on the read values and the dispersion of the read values.

As shown in FIG. 4A, colored toners 50 are deposited on the printing paper 46 corresponding to the drawings and the characters drawn on the document 40 (see FIG. 4D). Further, as shown in FIG. 4A, transparent toners 52 are applied, and deposited on the printing paper 46. In this embodiment, the amount of the transparent toner 52 becomes large for the area where the dispersion is small. Therefore, a larger amount of the transparent toner 52 is deposited at the area corresponding to the dispersion B2 where the dispersion is small compared with the area corresponding to the dispersion B3 where the dispersion is greater than that of the dispersion B2. Further, the transparent toner 52 is not deposited on the area corresponding to the plain paper 43 with the greater dispersion B1.

Figure 5:
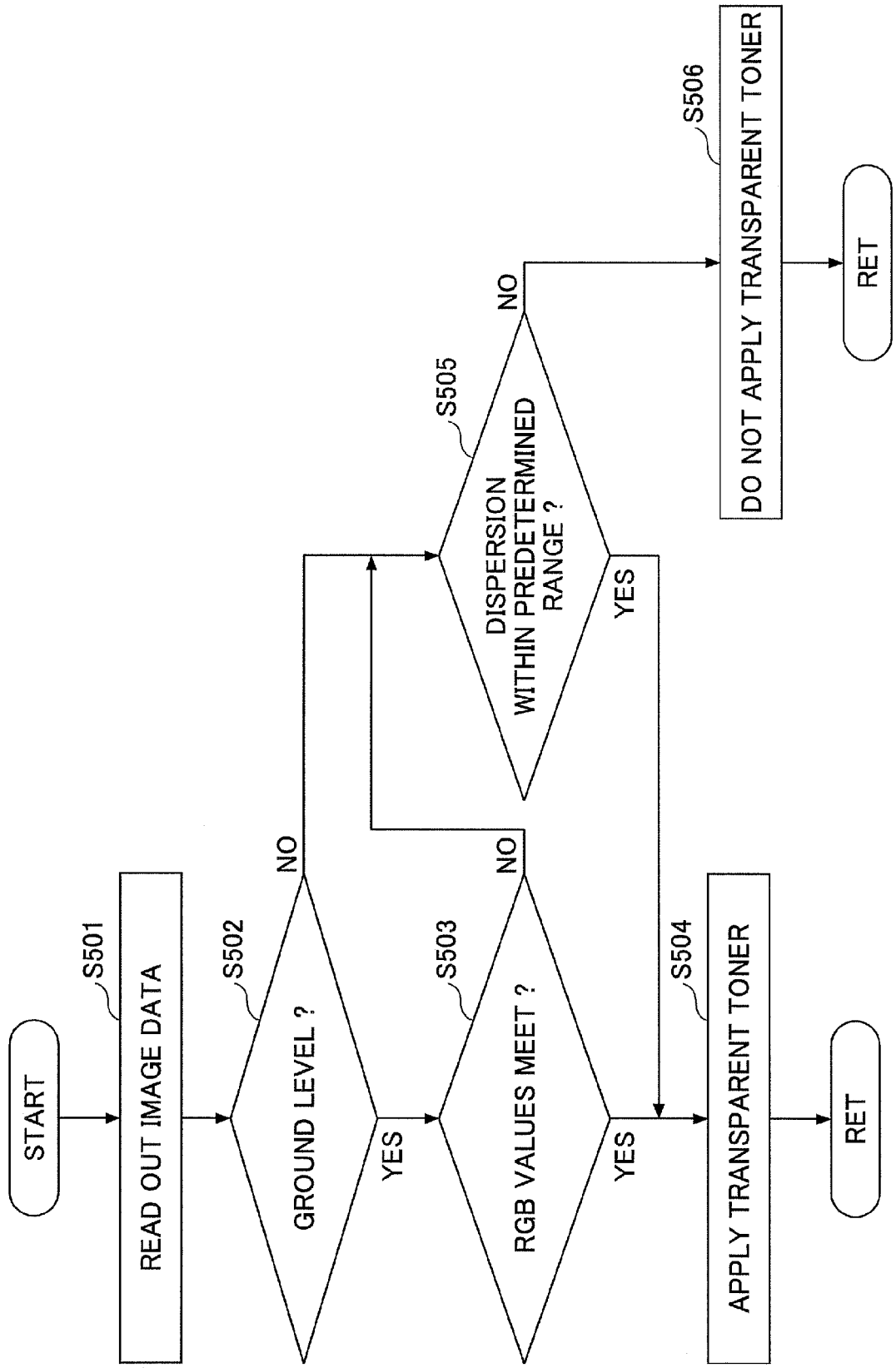
FIG. 5 is a flowchart, for explaining an operation of a gloss applying unit of the embodiment.

Operation of the gloss applying unit 304 of the present embodiment will be explained. FIG. 5 is a flowchart for explaining an operation of the gloss applying unit 304 of the first embodiment. The following operations will be performed for each of the pixels of the image data.

The gloss applying unit 304 of the present embodiment reads out the image data from the image memory 217 via the memory controller 216 (step S501). The image data of the present embodiment includes the read values for each of the pixels of the image data. The image data stored in the image memory 217 may be image data read by the scanners 210 and 211 of the image forming apparatus 100.

Subsequently, the gloss applying unit 304 determines whether the read value of the respective target pixel is a ground level (step S502). Concretely, the gloss applying unit 304 detects whether the read value of the target pixel is more than or equal to a predetermined threshold value which is previously set for detecting whether the read value is a ground level. This predetermined threshold value will be referred to as a ground threshold value hereinafter.

For example, when the ground threshold value is set as "T" as shown FIG. 4C, when the read value is more than or equal to the ground threshold value "T", the respective pixel is determined as the ground level (Yes in step S502).

When the read value of the respective value is determined as the ground level in step S502 (Yes in step S502), the gloss applying unit 304 determines whether the paper is a kind of paper for which the transparent toner is to be applied based on the RGB values of the target pixel (step S503). The kind of paper for which the transparent toner is to be applied may be a glossy paper, a photographic paper and the like. Concretely, the gloss applying unit 304 of the present embodiment may previously store RGB values for the kinds of paper for which the transparent toner is to be applied. The gloss applying unit 304 may determine whether the RGB values of the respective pixel meet the stored RGB values. In this embodiment, the gloss applying unit 304 may determine that the RGB values of the respective pixel do meet the stored RGB values when the RGB values of the respective pixel is within a predetermined error range between the stored RGB values.

When the gloss applying unit 304 determines that the paper is the kind of paper for which the transparent toner is to be applied in step S503 (Yes in step S503), the gloss applying unit 304 determines to apply the transparent toner on the target pixel and determines the target pixel as the applying area (step S504).

When the read value of the respective pixel is determined not to be the ground level (No in step S502), or when the paper is not the kind of paper for which the transparent toner is to be applied in step S503 (No in step S503), the gloss applying unit 304 determines whether the dispersion or the smoothness of the read value of the respective pixel is within a predetermined range (step S505). The process of step S505 will be explained later in detail.

When the dispersion or the smoothness of the read value of the target pixel is within the predetermined range in step S505 (Yes in step S505), the gloss applying unit 304 determines to apply the transparent toner on the target pixel and determines the target pixel as the applying area (step S504).

When the dispersion or the smoothness of the read value of the respective pixel is not within the predetermined range in step S505 (No in step S505), the gloss applying unit 304 determines not to apply the transparent toner on the target pixel (step S506). This operation is performed for all of the pixels of the image data.

Figure 6:
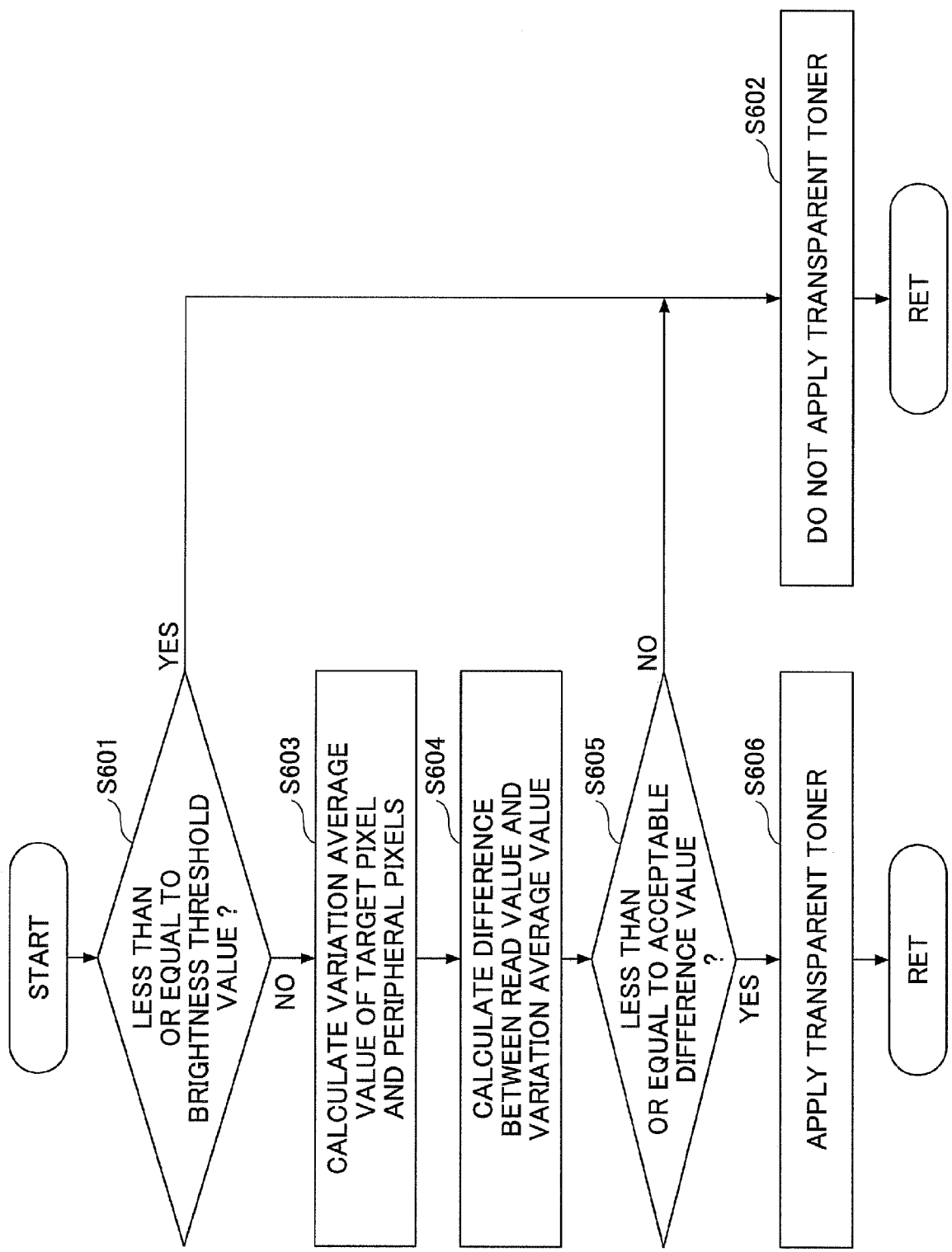
FIG. 6 is a flowchart for explaining the process of step S505 of FIG. 5 of the embodiment.

Referring to FIG. 6, the process of step S505 is explained in detail. FIG. 6 is a flowchart for explaining the process of step 505 of FIG. 5 in this embodiment.

The gloss applying unit 304 determines whether the read value of the respective pixel is less than or equal to a predetermined value (step S601). The predetermined value in step S601 may be a threshold value for determining whether to apply the transparent toner based on the brightness of the pixel (read value) and is referred to as a brightness threshold value hereinafter.

When the read value of the respective pixel is less than or equal to the brightness threshold value in step S601 (Yes in step S601), the gloss applying unit 304 determines not to apply the transparent toner on the respective pixel (step S602, same as step S506 in FIG. 5). It means that the drawing parts or the part where the character with dark colors as shown in FIG. 4D may be determined not have the transparent toner applied at this step.

When the read value of the respective pixel is more than the brightness threshold value in step S601 (No in step S601), the gloss applying unit 304 calculates a variation average value based on the read value of the target pixel and read values of peripheral pixels of the target pixel (step S603).

The target pixel of the present embodiment is the respective pixel for which the determination whether to apply the transparent toner is performed. The peripheral pixels are pixels which exist within a predetermined range from the target pixel. The predetermined range (and a number of pixels) for setting the peripheral pixels may be previously set. The gloss applying unit 304 calculates an average value of the read values of the target pixel and the read value of the peripheral pixels as the variation average value in step S603.

Figure 7:
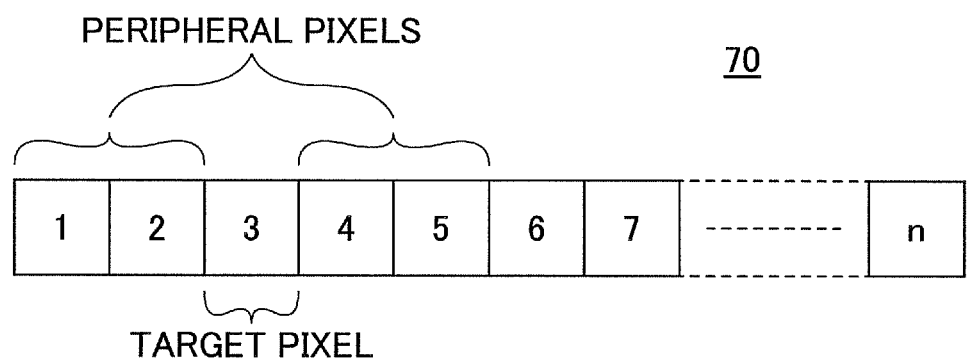
FIG. 7 is an explanatory view for explaining a target pixel, peripheral pixels, and a variation average value of the embodiment.

Referring to FIG. 7, the target pixel, the peripheral pixels, and the variation average value are explained. FIG. 7 is an explanatory view for explaining the target pixel, the peripheral pixels, and the variation average value of the embodiment.

A line 70 shows a single line of the image data read from the document. The line 70 is composed of n pixels including a pixel 1, a pixel 2, a pixel 3, . . . and a pixel n.

In this embodiment, the variation average value of the target pixel is an average value of the read value of the target pixel and the read values of the peripheral pixels.

It is assumed that the range of the peripheral pixels for each of the lines is set as five pixels (including the target pixel) with having the target pixel position center. When the pixel 3 is the target pixel, the pixels 1, 2, 4 and 5 become the peripheral pixels of the target pixel 3. In such a case, the variation average value becomes an average value of the read values of the pixels 1 to 5.

When the target pixel position is at the edge of the image data, the peripheral pixels may be selected with the target pixel not at the center position. For example, when the pixel 1 is the target pixel in FIG. 7, the pixels 2 to 5 may be selected as the peripheral pixels of the target pixel 1.

Therefore, in such a case as well, the gloss applying unit 304 calculates the average value of the read values of the pixels 1 to 5 as the variation average value at step S603 in FIG. 6.

Subsequently, the gloss applying unit 304 calculates a difference between the read value of the target pixel and the calculated variation average value (step S604). The difference in brightness between the target pixel and the peripheral pixels can be detected by the thus calculated difference. When the difference is large, it means that the brightness of the target pixel is different from those of the peripheral pixels. In such a case, it means that the target pixel does not assort with the peripheral pixels. In this embodiment, the difference is assumed as the dispersion of the brightness of the image data.

Then, the gloss applying unit 304 determines whether the difference between the read value of the target pixel and the calculated variation average value is less than or equal to a predetermined value (step S605). The predetermined value in step S605 may be a value that defines an acceptable difference in brightness between the target pixel and the peripheral pixels. The predetermined value in step S605 is referred to as an acceptable difference value hereinafter.

When the calculated difference is less than or equal to the acceptable difference value in step S605 (Yes in step S605), the gloss applying unit 304 determines to apply the transparent toner on the respective pixel and determines the target pixel as the applying area (step S606, same as step S504 in FIG. 5).

When the calculated difference is more than the acceptable difference value in step S605 (No in step S605), the gloss applying unit 304 determines not to apply the transparent toner on the target pixel (step S602).

In this embodiment, when the difference between the read value of the target pixel and the variation average value is less than or equal to the acceptable difference value, it is determined that the gradation (or concentration) of the target pixel is closer to those of the peripheral pixels and therefore, the target pixel is determined as the applying area. When, on the other hand, if the difference between the read value of the target pixel and the variation average value is more than the acceptable difference value, it is determined that the gradation (or concentration) of the target pixel is different from those of the peripheral pixels and therefore, the target pixel is not determined as the applying area.

The gloss applying unit 304 of the present embodiment determines whether to set the applying area for each of the pixels and determines the area where the transparent toner is to be applied.

Although the difference between the read value of the target pixel and the variation average value is used for determining whether to set the applying area in FIG. 6, other values may be used instead.

For example, a dispersion value may be obtained from the difference between the read value of the target pixel and the variation average value, and the determination of whether to set the applying area may be performed based on the dispersion value.

In such a case, the dispersion value may be obtained from the differences between the read value of the target pixel and the variation average values of plural groups of pixels each including the target pixel. For example, in FIG. 7, a case where the peripheral pixels are selected from the pixels in the same line as the target pixel in the lateral direction is shown. However, the peripheral pixels may be selected from the pixels in the same line as the target pixel in the longitudinal direction, or the pixels along an inclined line on which the target pixel exists.

Alternatively, the dispersion value may be obtained by difference values between the read value of the target pixel and the read values of the peripheral pixels. In such a case, weighting values may be applied to the differences based on the distance between the target pixel and the respective peripheral pixels.

Figure 8:
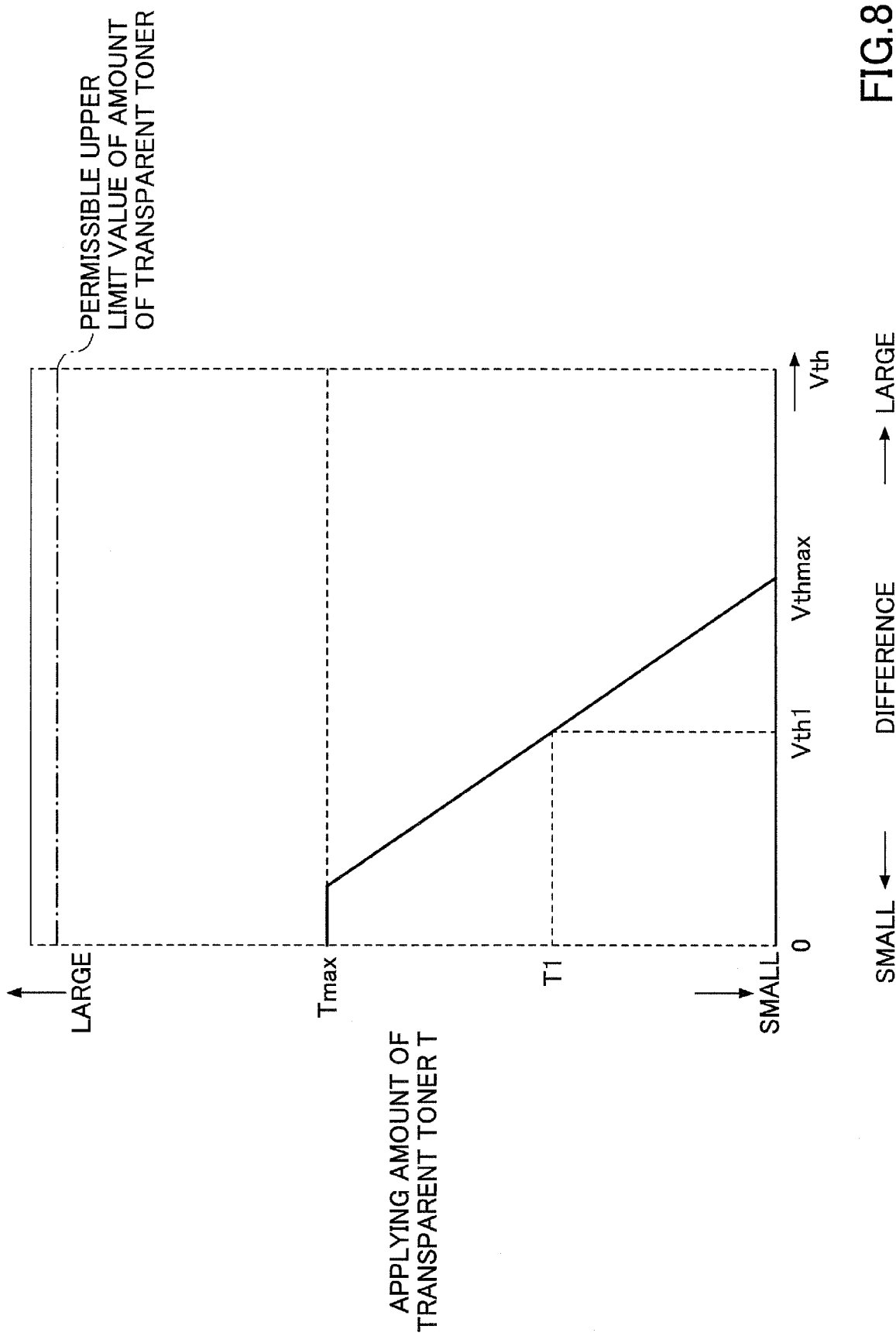
FIG. 8 is an explanatory view for explaining calculating an amount of a transparent toner to be applied in the embodiment.

A method of calculating an amount of applying the transparent toner will be explained. FIG. 8 is an explanatory view for explaining calculating the amount of the transparent toner to be applied in the first embodiment.

In FIG. 8, the vertical axis (ordinate) expresses the applying amount of the transparent toner T, and the horizontal axis (abscissa) expresses the difference Vth between the read value of the target pixel and the variation average value.

The gloss applying unit 304 of the present embodiment includes a storing unit (not shown in the drawings) that stores corresponding data defining a relationship between the difference Vth (the dispersion) and the applying amount of the transparent toner T. In this embodiment, the corresponding data may be a function defining the relationship between the difference Vth and the applying amount of the transparent toner T as shown in FIG. 8. The gloss applying unit 304 refers to the function and obtains the applying amount of the transparent toner T corresponding to the calculated difference Vth calculated in step 604 in FIG. 6.

For example, for the case shown in FIG. 8, when the difference Vth is the maximum value Vthmax, that is the acceptable difference value, the gloss applying unit 304 obtains the applying amount of the transparent toner T as zero (T=0). When the difference Vth is zero, it means that the color of the target pixel is the same as those of the peripheral pixels, and the gloss applying unit 304 obtains the applying amount of the transparent toner T as the maximum value of Tmax. When the difference Vth is equal to Vth1, the gloss applying unit 304 obtains the applying amount of the transparent toner T as T1, as shown in FIG. 8.

In this embodiment, an appropriate amount of the transparent toner can be applied in accordance with the difference between the read value of the target pixel and the variation average value as described above.

Further, in this embodiment, the storing unit of the gloss applying unit 304 may store plural functions, each of which defines the relationship between the applying amount of the transparent toner T and the difference Vth, where the maximum values Tmax of the applying amount of the transparent toner T are different.

For example, when the read value of the target pixel is more than or equal to a predetermined value, the maximum value Tmax of the applying amount of the transparent toner T may be set higher provided that it does not exceed the permissible upper limit value for the applying amount of the transparent toner. With this, a larger amount of the transparent toner can be applied on the brighter pixel to give higher gloss to it.

Figure 14:
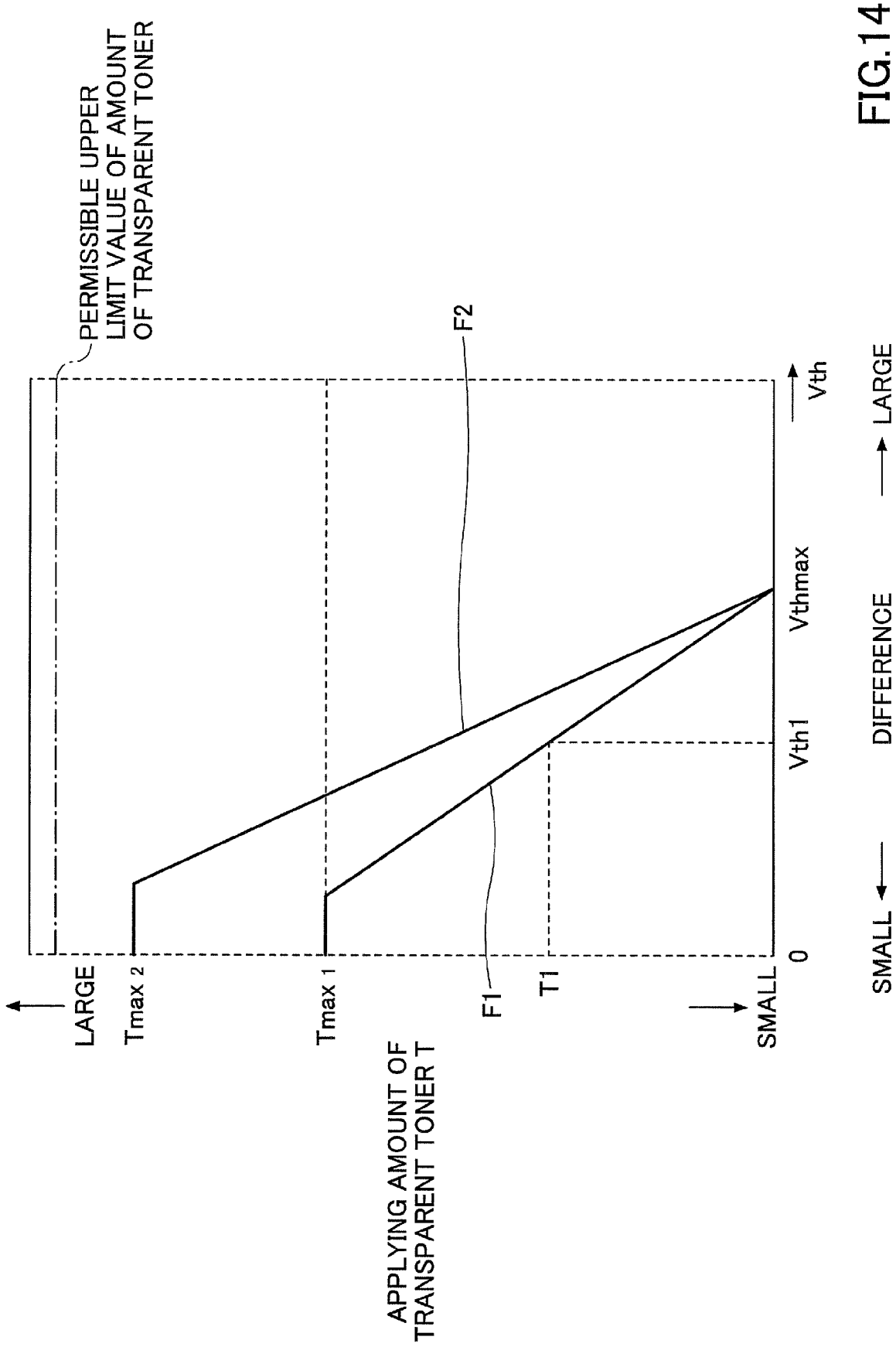
FIG. 14 is an explanatory view for explaining calculating an amount of a transparent toner to be applied in the embodiment.

An example for this case is shown in FIG. 14. As shown in FIG. 14, the storing unit of the gloss applying unit 304 stores a first function F1 and a second function F2 where the maximum value Tmax2 of the function F2 is higher than the maximum value Tmax1 of the function F1. The gloss applying unit 304 selects the function F1 or the function F2 in accordance with the read value of the target pixel. For example, the gloss applying unit 304 may select the function F2 when the read value of the target pixel is more than or equal to a predetermined value, which means that the target pixel is brighter than the predetermined value.

Figure 9:
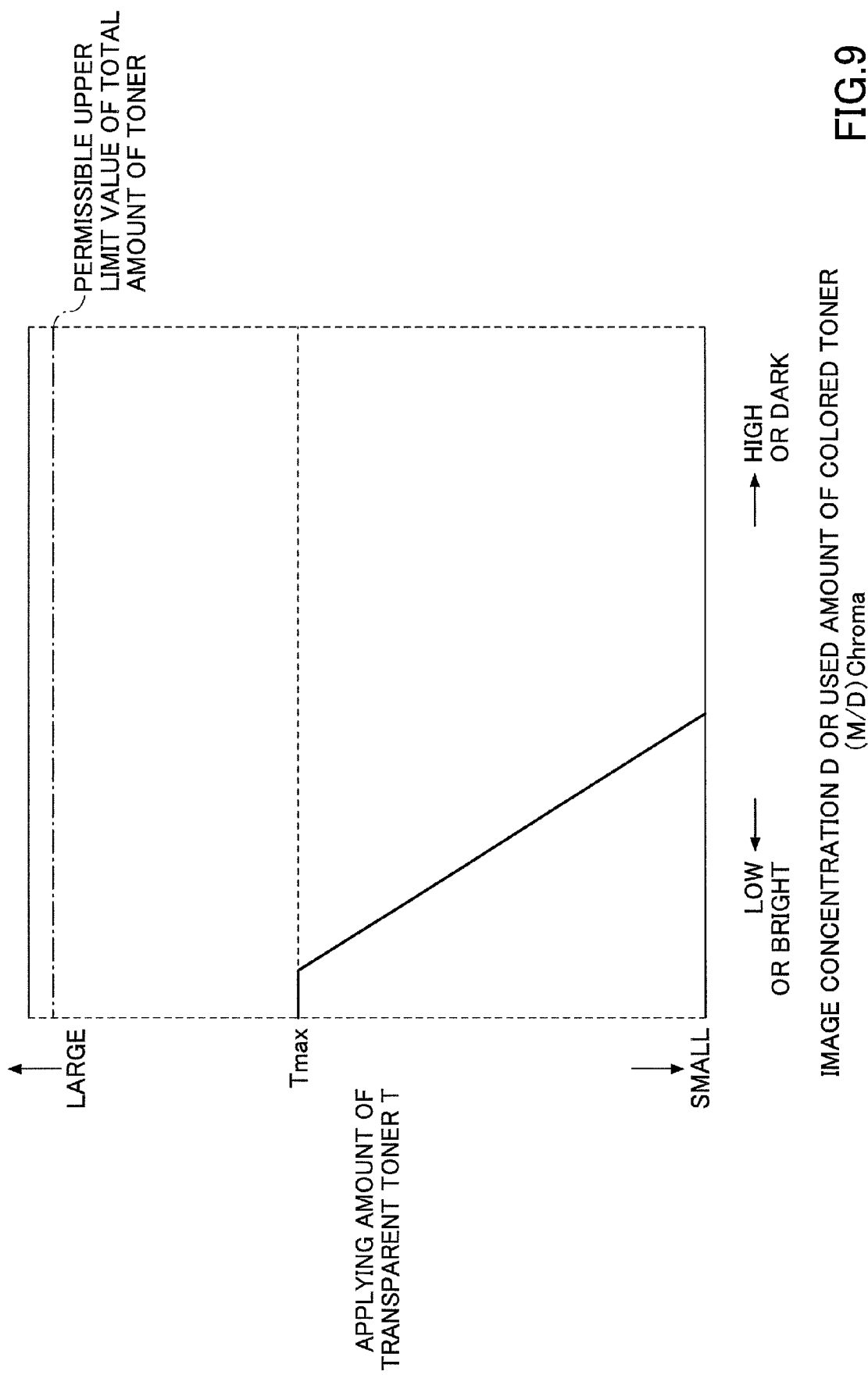
FIG. 9 is an explanatory view showing another example for calculating the amount of the transparent toner to be applied in the embodiment.

FIG. 9 is an explanatory view showing another example of a function for calculating the applying amount of the transparent toner. As for the example in FIG. 9, the vertical axis expresses the applying amount of the transparent toner T and the horizontal axis expresses the image concentration D (or used amount of a colored toner). For the example in FIG. 9, the applying amount of the transparent toner T becomes smaller as the image concentration becomes higher.

Further in FIG. 9, an example of a case where the horizontal axis expresses the used amount of a colored toner (CMYK) is also shown. When such a case where the horizontal axis expresses the used amount of a colored toner, the applying amount of the transparent toner T becomes smaller as the deposit amount (used amount) of the colored toner becomes larger.

Further, although the function defining the relationship between the difference Vth and the applying amount of the transparent toner T is shown in this embodiment, it is not so limited. The relationship between the difference Vth and the applying amount of the transparent toner T may be defined in a table or the like in the storing unit of the gloss applying unit 304.

Further in this embodiment, by setting the maximum applying amount of the transparent toner Tmax as being less than the upper limit value of the applying amount of the transparent toner for the image forming apparatus 100, the consumption amount of the transparent toner can be reduced while applying the transparent toner on an appropriate area.

Further in this embodiment, although the brightness is used for the read value of the pixels, it is not so limited. In this embodiment, the brightness of the read value of the image data may be a brightness which is in a proportional relationship with the reflectance (read value) obtained by reading the document.

In this embodiment, alternatively, an image concentration may be calculated for each of the pixels and the applying area where the transparent toner is to be applied and the amount of applying the transparent toner may be determined based on the thus calculated image concentration. Here, the values of the image concentration become opposite to those of the read values expressing the brightness. It means that the pixel with a high reflectance value has a low image concentration value while the pixel with a low reflectance value has a high image concentration value. The image concentration value may be obtained in accordance with the following equation.

Image concentration value=exp(−a read value being in a proportional relationship with the reflectance)

Further in this embodiment, alternatively, lightness values obtained by calculating based on the read values of brightness may be used. The lightness values may be shown by (a read value being in a proportional relationship with the reflectance)$^\gamma$ (power function with an exponent of $\gamma$). Here, the exponent $\gamma$ may be ($\frac{1}{3}$) to ($\frac{1}{4}$).

In this embodiment, although the image data is obtained by reading the document by a scanner of the image forming apparatus 100, it is not so limited. In the image forming apparatus 100 of the present embodiment, the above embodiment may be applied, for example, when printing image data sent from a computer connected to the image forming apparatus 100 via a network. In such a case, the image forming apparatus 100 may have an additional area separation-ACS detection circuit for applying the above embodiment to the image data received from the computer. In such a case, the computer may have a function to process image data for having the image forming apparatus 100 recognize the ground part and the drawing part.

As described above, according to the structure of the present embodiment, whether the transparent toner is to be applied is determined for each of the pixels based on the difference between the read value of the target pixel and the peripheral pixels of the target pixel in the image data.

Further, when it is determined that the pixel to have the transparent toner applied, the applying amount of the transparent toner is determined for each of the pixels. Therefore, according to the present embodiment, the area where the transparent toner is to be applied and the applying amount of the transparent toner are automatically determined just by scanning the document, and the consumption amount of the transparent toner can be reduced.

(Second Embodiment)

Next, the second embodiment will be described below with reference to drawings. Only the method of determining the dispersion of the read value is different from that of the first embodiment. In the following embodiment, only the part different from the first embodiment will be explained.

Figure 10:
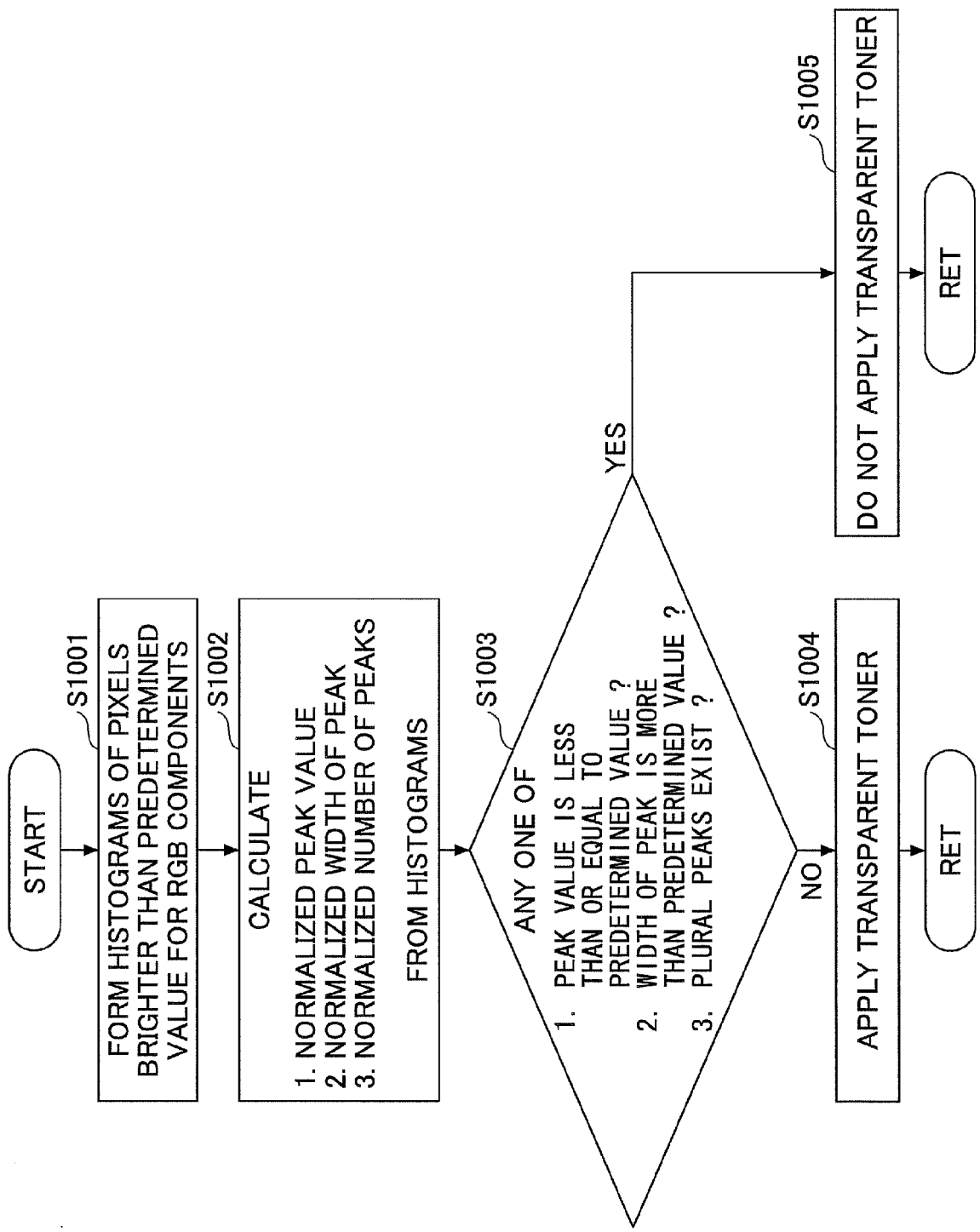
FIG. 10 is a flowchart for explaining operations for determining a dispersion of the read values.

FIG. 10 is a flowchart for explaining operations for determining a dispersion of the read values of the second embodiment. The processes of FIG. 10 correspond to the process of step S505 of FIG. 5.

In this embodiment, after the image data is read, the dispersion of the image data is determined based on a peak value of the frequency with respect to the read value, a width of the peak, a number of peaks or the like of the image data within a predetermined area formed by a predetermined number of pixels.

In this embodiment, the gloss applying unit 304 forms histograms of the pixels whose read values are more than or equal to a predetermined value (bright pixels) within the predetermined area for RGB components (step S1001). The predetermined area and the predetermined value used in step S1001 may be previously set. The predetermined area may be set as 5 pixels×5 pixels, for example.

Subsequently, the gloss applying unit 304 calculates a normalized peak value of the frequency with respect to the read value, a normalized width of the peak, and a normalized number of peaks normalized by the number of pixels from the obtained histogram (step S1002). The width of the peak may be a half-width of the peak of the histogram.

Subsequently, the gloss applying unit 304 determines not to apply the transparent toner when the respective area meets at least one of the following three conditions (step S1003). The three conditions are, the peak value is less than or equal to a predetermined value, the width of the peak is greater than a predetermined value, and plural peaks exist for the respective color component.

When the obtained condition for the respective area does not meet any of the three conditions (No in step S1003), the gloss applying unit 304 determines that the dispersion for the image data is small and determines the respective area as the applying area (step S1004).

When, on the other hand, the obtained condition for the respective area meets any one of the three conditions (Yes in step S1003), the gloss applying unit 304 determines that the dispersion for the image data is large and determines not to apply the transparent toner (step S1005).

Figure 11:
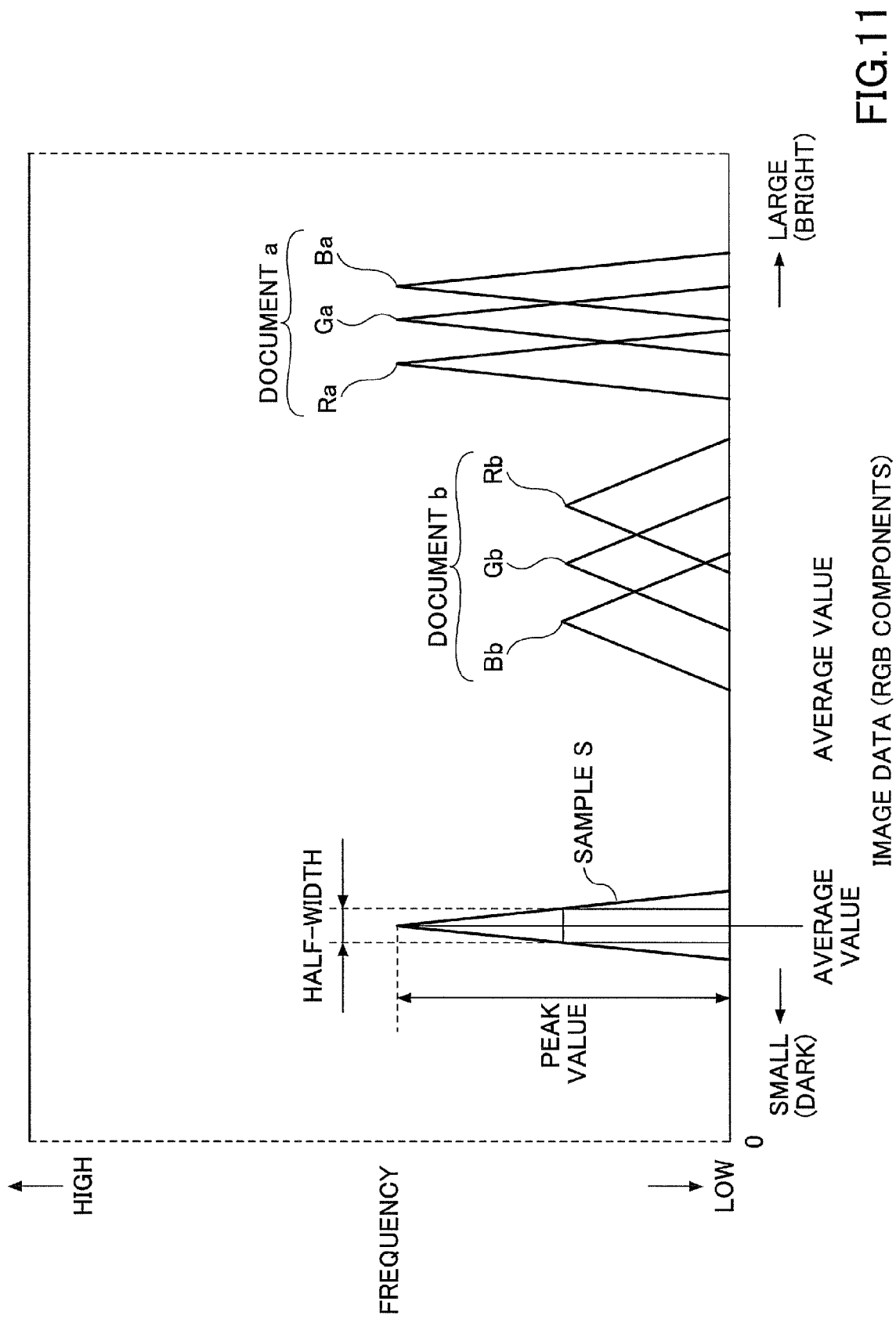
FIG. 11 is an explanatory view showing histograms obtained in the embodiment.

An example of a histogram will be explained with reference to FIG. 11. FIG. 11 shows an example of the histogram obtained in the second embodiment.

The horizontal axis of FIG. 11 expresses reflectance of RGB components of the image data where the higher the value is, the brighter the image is and the lower the value is, the darker the image is. The vertical axis of FIG. 11 expresses frequency.

Referring to the sample S in FIG. 11, the peak value and the width of the peak are explained. As shown in the sample S, the peak value is assumed as the upper value of the frequency and the width of the peak is assumed as the half-width in this example.

Further in FIG. 11, histograms of RGB components of ground parts of two kinds of documents, a document "a" and a document "b" of the same numbers of the pixels are shown. As for the document "a", the RGB components are labeled Ra, Ga and Ba, while for the document "b", the RGB components are labeled Rb, Gb and Bb, respectively.

As for the case in FIG. 11, for the document "a", the brightness values are Ra<Ga<Ba, while for the document "b", the brightness values are Bb<Gb<Rb. The peak values of the histograms of the document "a" are greater than those of the document "b". Further, the widths of the peaks of the histograms of the document "a" are less than those of the document "b".

It means that the gloss applying unit 304 determines that the dispersion of the ground parts of the document "a" is smaller than that of the document "b". Further, the gloss applying unit 304 may determine that the smoothness of the document "a" is higher than that of the document "b" and may determine to increase the applying amount of the transparent toner on the document "a".

(Third Embodiment)

Next, the third embodiment will be described below with reference to drawings. Only the method of determining the dispersion of the read value where a dot (halftone dot) is detected in the third embodiment is different from that of the first embodiment. In the following embodiment, only the part different from the first embodiment will be explained.

Figure 12:
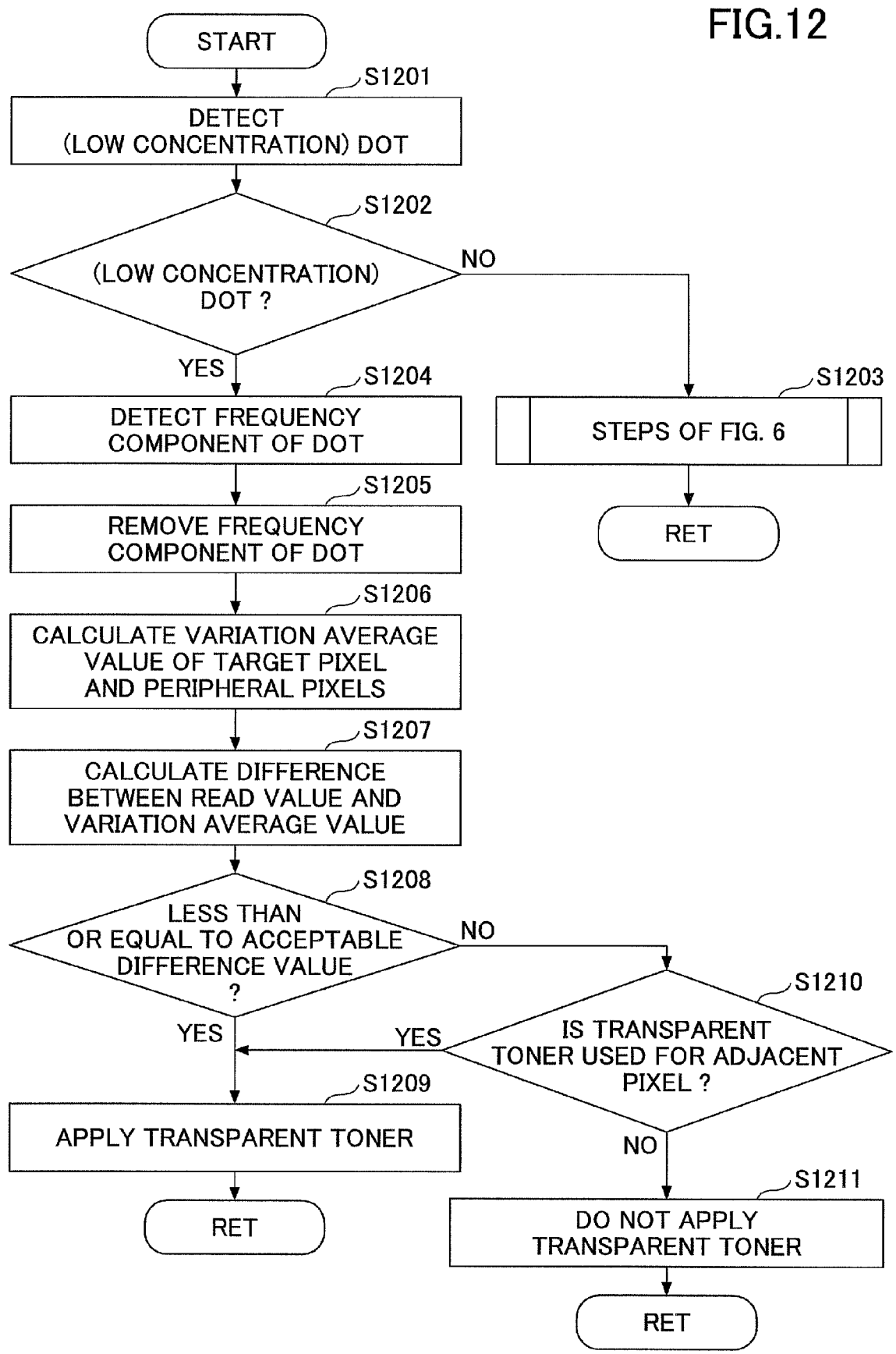
FIG. 12 is a flowchart for explaining operations for determining a dispersion of the read values.

FIG. 12 is a flowchart for explaining operations for determining a dispersion of the read values of the third embodiment.

In this embodiment, the area separation unit 303 detects whether the target pixel is a dot. When the target pixel is not the dot in step S1201 (No in step S1202), the gloss applying unit 304 performs the processes of FIG. 6 (step S1203). When the target pixel is detected to be the dot in step S1202 (Yes in step S1202), the gloss applying unit 304 detects a frequency component of the dot (step S1204). Subsequently, the gloss applying unit 304 removes the frequency component of the dot of the pixel which is detected as the dot (step S1205).

The processes of step S1206 to step S1209 in FIG. 12 are the same as step S603 to step S606 in FIG. 6 and the explanations are not repeated.

In step S1208, when the difference between the read value of the target pixel and the variation average value is greater than a predetermined value (an acceptable difference value) (No in step S1208), the gloss applying unit 304 determines whether the transparent toner is to be applied to an adjacent pixel of the target pixel (step S1210). When the difference between the read value of the target pixel and the variation average value is less than or equal to a predetermined value (an acceptable difference value) (Yes in step S1208), or when the transparent toner is to be applied to the adjacent pixel of the target pixel in step S1210 (Yes in step S1210), the gloss applying unit 304 proceeds to step S1209, and determines the target pixel as the applying area. When, on the other hand, the transparent toner is not to be applied to the adjacent pixel of the target pixel in step S1210 (No in step S1210), the gloss applying unit 304 determines not to apply the transparent toner on the target pixel (step S1211).

According to the present embodiment, whether to apply the transparent toner can be determined based on whether the target pixel is a dot.

(Fourth Embodiment)

Next, the fourth embodiment will be described below with reference to drawings. In the following embodiment, only the part different from the first embodiment will be explained.

In this embodiment, when determining the dispersion of the image data, an autocorrelation function is calculated based on the difference between the read value of the target pixel and the variation average value, and whether the transparent toner is applied is determined based on the autocorrelation function.

Figure 13:
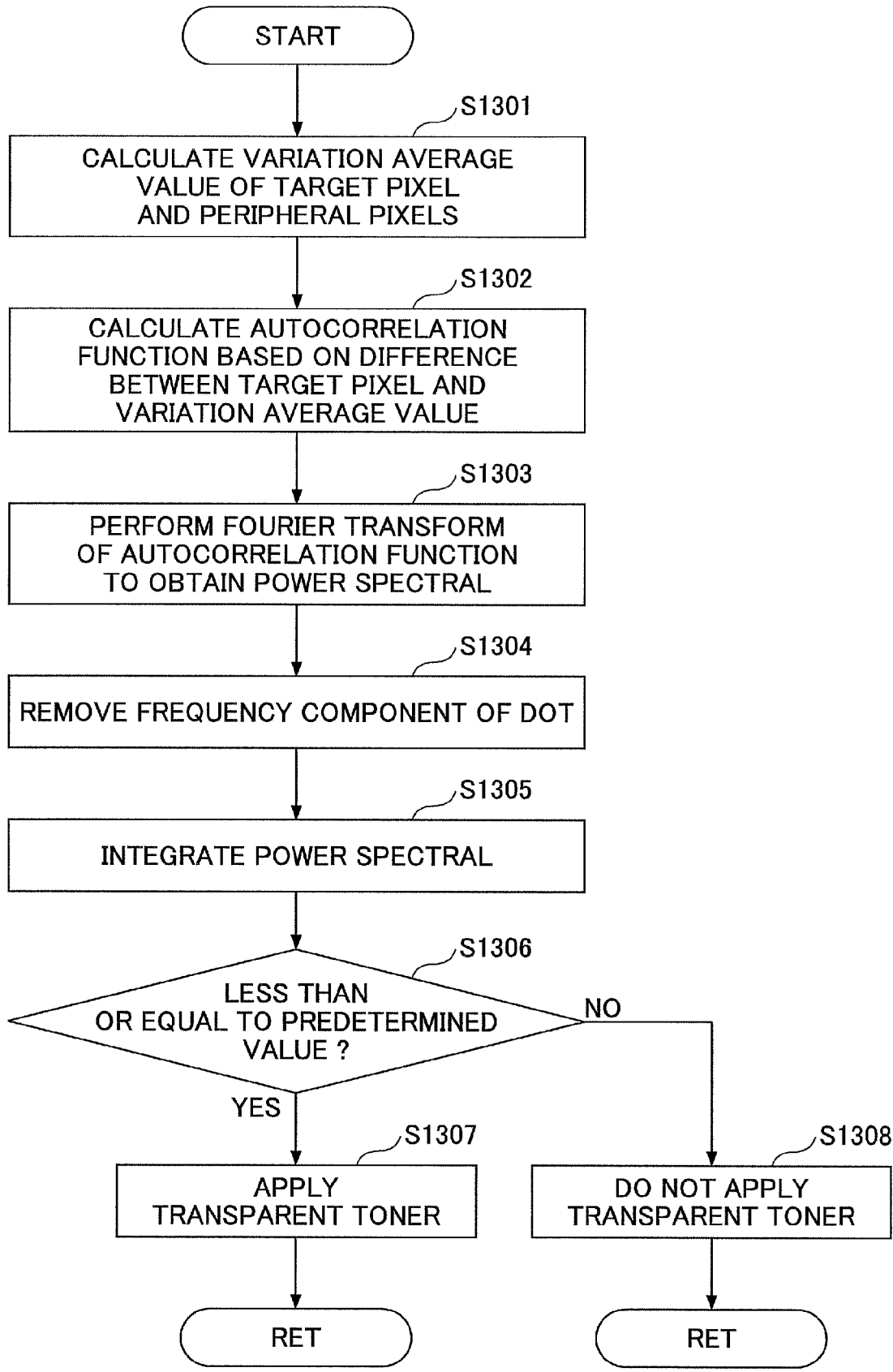
FIG. 13 is a flowchart for explaining operations for determining a dispersion of the read values.

FIG. 13 is a flowchart for explaining operations for determining the dispersion of the read values in the fourth embodiment.

In this embodiment, the gloss applying unit 304 calculates the variation average value based on the read values of the target pixel and the peripheral pixels (step S1301). Subsequently, the gloss applying unit 304 calculates the autocorrelation function based on the difference between the read value of the target pixel and the variation average value (step S1302). Then, the gloss applying unit 304 performs a Fourier transform of the autocorrelation function to obtain a power spectral (step S1303).

Subsequently, the gloss applying unit 304 removes the frequency component of the dot (step S1304). Then, the gloss applying unit 304 integrates the power spectral (step S1305).

After that, the gloss applying unit 304 determines whether the integrated value is less than or equal to a predetermined value (step S1306).

When the integrated value is less than or equal to the predetermined value in step S1306 (Yes in step S1306), the gloss applying unit 304 determines the target pixel as the applying area where the transparent toner is to be applied (step S1307). When, on the other hand, when the integrated value is more than the predetermined value in step S1306 (No in step S1306), the gloss applying unit 304 determines not to apply the transparent toner on the target pixel (step S1308).

According to the present embodiment, whether to apply the transparent toner can be determined based on the difference between the read value of the target pixel and the variation average value.

The present invention is not limited to the specifically disclosed embodiments, and variations and modifications may be made without departing from the scope of the present invention.

The present application is based on Japanese Priority Application No. 2010-292098 filed on Dec. 28, 2010, and Japanese Priority Application No. 2011-244776 filed on Nov. 8, 2011, the entire contents of which are hereby incorporated herein by reference.

What is claimed is:

1. An image forming apparatus capable of forming an image with a colored toner and a transparent toner based on image data of a read document, comprising:
 a dispersion calculation unit that calculates a dispersion of a target pixel and a group of pixels including the target pixel and peripheral pixels of the target pixel, for each of the pixels of the image data;
 an applying area determining unit that determines whether to apply the transparent toner on the target pixel based on the dispersion of the target pixel, for each of the pixels of the image data; and
 an amount determining unit that determines an amount of the transparent toner to be applied on the target pixel for which the transparent toner is determined to be applied based on the dispersion of the target pixel, for each of the pixels of the image data,
 wherein the amount determining unit determines the amount of the transparent toner to be applied on the target pixel based on the dispersion of the target pixel so that the amount of the transparent toner to be applied becomes larger as the dispersion of the target pixel is smaller.

2. The image forming apparatus according to claim 1, wherein the dispersion is a difference between the read value of the target pixel and an average value of the read values of the group of pixels of a predetermined number including the target pixel and the peripheral pixels of the target pixel.

3. The image forming apparatus according to claim 2, wherein the applying area determining unit determines to apply the transparent toner on the target pixel when the difference between the read value of the target pixel and the average value is less than or equal to a predetermined value while determines not to apply the transparent tonner on the target pixel when the difference between the read value of the target pixel and the average value is more than the predetermined value.

4. The image forming apparatus according to claim 1, wherein the amount determining unit includes a storing unit that stores corresponding data defining a relationship between the dispersion and the amount of the transparent toner to be applied, and refers to the corresponding data to determine the amount of the transparent toner to be applied based on the dispersion.

5. The image forming apparatus according to claim 4, wherein the storing unit stores plural of the corresponding data each of which defines the relationship between the dispersion and the amount of the transparent toner to be applied where the maximum values of the amount of the transparent toner to be applied are different, and the amount determining unit selects the corresponding data in accordance with the read value of the target pixel.

6. The image forming apparatus according to claim 5, the amount determining unit selects the corresponding data in accordance with the read value of the target pixel so that the corresponding data where the maximum value of the amount of the transparent toner to be applied is higher is selected when the read value of the target pixel is brighter.

7. The image forming apparatus according to claim 2, wherein the read value is a value expressing brightness of each pixel.

8. The image forming apparatus according to claim 3, wherein the read value is a value expressing brightness of each pixel.

9. The image forming apparatus according to claim 2, wherein the dispersion is the dispersion value obtained from the difference between the read value of the target pixel and the average value, for each of the pixels of the image data.

10. The image forming apparatus according to claim 1, wherein the applying area determining unit determines to apply the transparent toner on the target pixel when the dispersion of the target pixel is within a predetermined range.

11. A method of forming an image by an image forming apparatus capable of forming an image with a colored toner and a transparent toner based on image data of a read document, the method comprising:
 calculating a dispersion of a target pixel and a group of pixels including the target pixel and peripheral pixels of the target pixel, for each of the pixels of the image data;
 determining whether to apply the transparent toner on the target pixel based on the dispersion of the target pixel, for each of the pixels of the image data; and
 determining an amount of the transparent toner to be applied on the target pixel for which the transparent toner is determined to be applied based on the dispersion of the target pixel, for each of the pixels of the image data,
 wherein in determining the amount of the transparent toner to be applied on the target pixel, the amount of the transparent toner to be applied on the target pixel is determined so that the amount of the transparent toner to be applied becomes larger as the dispersion of the target pixel is smaller.

12. The method of forming an image according to claim 11, wherein in determining whether to apply the transparent toner on the target pixel, it is determined to apply the transparent toner on the target pixel when the dispersion of the target pixel is within a predetermined range.

13. A non-transitory computer-readable recording medium having recorded thereon a program that causes a computer of an image forming apparatus, capable of forming an image with a colored toner and a transparent toner based on image data of a read document, to execute a method, the method comprising:
 calculating a dispersion of a target pixel and a group of pixels including the target pixel and peripheral pixels of the target pixel, for each of the pixels of the image data;

determining whether to apply the transparent toner on the target pixel based on the dispersion of the target pixel, for each of the pixels of the image data; and determining an amount of the transparent toner to be applied on the target pixel for which the transparent toner is determined to be applied based on the dispersion of the target pixel, for each of the pixels of the image data, wherein in determining the amount of the transparent toner to be applied on the target pixel, the amount of the transparent toner to be applied on the target pixel is determined so that the amount of the transparent toner to be applied becomes larger as the dispersion of the target pixel is smaller.

14. The non-transitory computer-readable recording medium according to claim 13, wherein in determining whether to apply the transparent toner on the target pixel of not, it is determined to apply the transparent toner on the target pixel when the dispersion of the target pixel is within a predetermined range.

* * * * *